United States Patent [19]

Allsen et al.

[11] 4,223,211
[45] Sep. 16, 1980

[54] PEDOMETER DEVICES

[75] Inventors: Philip E. Allsen; Brent Q. Hafen, both of Provo, Utah

[73] Assignee: Vitalograph (Ireland) Limited, Ennis, Ireland

[21] Appl. No.: 892,772

[22] Filed: Apr. 3, 1978

[51] Int. Cl.² ............................................. G01C 22/00
[52] U.S. Cl. .......................... 235/92 DN; 235/92 DM
[58] Field of Search ......... 235/92 DN, 92 DM, 92 T, 235/105; 364/415, 561, 705; 58/152 R, 152 E

[56] References Cited

U.S. PATENT DOCUMENTS

| | | | |
|---|---|---|---|
| 3,614,617 | 10/1971 | Blake | 235/92 DM |
| 3,780,272 | 12/1973 | Rohner | 235/92 DN |
| 3,928,960 | 12/1975 | Reese | 364/705 |
| 4,019,037 | 4/1977 | Monna | 364/705 |
| 4,053,755 | 10/1977 | Sherrill | 235/92 DN |
| 4,062,181 | 12/1977 | Zurcher | 58/152 R |
| 4,074,196 | 2/1978 | Webster | 235/92 DN |
| 4,081,664 | 3/1978 | Washizuka et al. | 58/152 R |
| 4,103,332 | 7/1978 | Floyd et al. | 235/92 DN |
| 4,112,926 | 9/1978 | Schulman et al. | 235/92 FQ |

*Primary Examiner*—Joseph M. Thesz
*Attorney, Agent, or Firm*—Bierman & Bierman

[57] ABSTRACT

The invention provides a pedometer device of electronic form which may be accommodated in a wrist watch housing, if desired within an electronic wrist watch together with the watch parts. A visual display is produced by an electronic processor responsive to a read only memory, settable to provide a unit distance reference, and counter fed from a motion sensitive modulator. The ROM and counter can be arranged such that no multiplier device is required. The modulator may be in the form of a mass-loaded wire of spring-quality metal projecting into a surrounding contact cylinder. This arrangement gives a construction compact enough for housing within the watch case.

8 Claims, 4 Drawing Figures

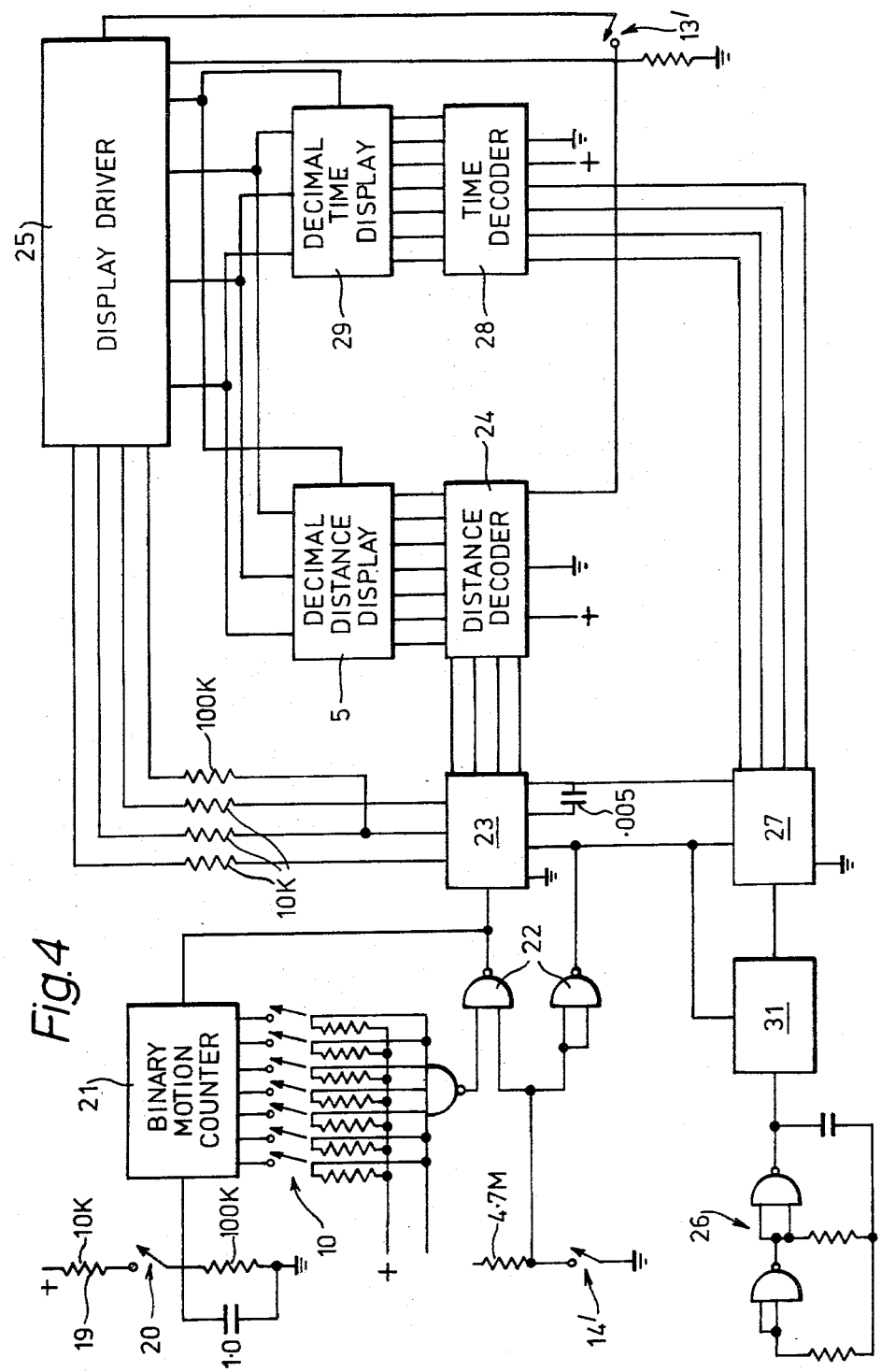

PEDOMETER DEVICES

BACKGROUND AND SUMMARY OF THE INVENTION

The present invention relates to pedometer devices, ie. devices which may be carried by a human subject for indicating the distance travelled on foot. The body of a subject walking or running undergoes a cyclic motion synchronised with the steps taken and, by responding to such motion a pedometer provides a count of the number of steps taken. This count may be displayed as such or in the form of a distance-travelled reading. In the latter case arrangements may be made for setting the instrument to suit the step-length of the particular subject.

An object of the present invention is to provide an improved pedometer device which is readily settable to suit the step-length and which may be constructed primarily from electronic components. Another object is to provide a pedometer device of such small size that it may be worn on the wrist in the manner of a wrist watch. A further object is to provide a pedometer device which may be housed within a wrist watch, eg. an electronic wrist watch, the power battery of which also serves to power the pedometer.

A further object is to provide an instrument which can be worn upon the wrist and actuated to give a display showing elapsed time, or a display showing distance covered on foot, as required.

A still further object is to provide a pedometer device which comprises (a) a battery-powered electrical circuit having an output, (b) a motion-sensitive modulator responsive to motions accompanying foot motions of the subject during said travelling to modulate said output and thereby provide discrete output signals, the number of which is a count of the number of said motions, (c) a read-only memory device presettable to provide a numerical value corresponding with the distance to be travelled by the subject for each one of said motions, (d) an electronic processor responsive to said output signals and to said read-only memory device to generate a distance signal representing the distance travelled by the subject, and (e) a visual display for said distance signal.

The said motions accompanying foot motions of the subject may be motions at any part of the body. They may for example, be leg motions, motions in the region of the waist or arm motions, arm motions monitored at the wrist being preferred as conducive to convenience in use. Some forms of travel on foot, for example jogging, involve pronounced arm motions related to the foot motions. It is within the scope of the invention for the modulator to be responsive to pronounced arm motions but not sensitive enough to be responsive to the less pronounced motions occurring elsewhere, eg. at the waist.

Various forms of motion-sensitive modulator may be employed. A preferred form of modulator is an inertia switch and in a preferred arrangement, the modulator is an on-off inertia switch and said circuit has a resistor in series with said inertia switch, and said processor is sensitive only to output signals of magnitude comparable with such output signals as would be obtainable by by-passing said inertia switch. In this way, minor motions such as motions produced during rest periods and producing only light, high resistance, closure of the inertia switch are ignored in the distance indication. A preferred form of the inertia switch, provided as an aspect of this invention, is a mass loaded electrically conductive resilient member and an electrically conductive contactable member positioned so as to be normally out of contact with said resilient member but contactable by said resilient member on reaction thereof to said motions. The contactable member is preferably configured to surround said resilient member, eg. being of hollow cylindrical configuration with the resilient member normally projecting substantially centrally therethrough. In this way, directional discrimination, which could cause miscounting is minimized.

For ease of presetting, the read-only memory (ROM) may be provided in the form of a bank of on-off switches. The two possible positions of each switch represent the two possible values, 0 and 1, of a digit in a binary numerical system and each combination of on-and off positions of the switches provides a binary number stored by the ROM. Short-circuiting plugs can be used in place of the switches but are unsatisfactory in that they are too small for convenient handling and readily lost.

Simplicity is achieved, according to another aspect of the invention, by (1) having the ROM presettable to provide a numerical value which is an inverse function of the distance to be travelled per unit motion by the subject (2) providing a counter arrangement responsive to the output signals from the modulator to produce a distance sub-unit each time the number of discrete output signals provided by the modulator is a predetermined integral multiple of the numerical value and (3) providing visual display means arranged to be incremented by the distance sub-unit signals and indicate the distance travelled.

A convenient example of an inverse function as aforesaid is the number of steps to be taken by the subject to travel a distance sub-unit of 50 feet. For most purposes, a distance display in miles and tenths thereof travelled (ie. a display to one place of decimals) is adequate and it is better to use the figures available for display to indicate miles rather than hundredths or thousandths of miles. Such fine measurements would be of doubtful utility even if they were accurate. A three digit display is better used for indicating a distance of from 0 to 99.9 miles than a distance of from 0 to 9.99 miles or 0 to 0.999 miles. The preferred smallest unit to be measured is 0.1 mile. Given 20 steps per 53 feet as a possible step rate, 0.1 mile involves 200 steps. This number requires 8 bits to represent it in binary notation. To be of reasonably wide utility in allowing for shorter steps, 9 bits are required.

A 9 bit ROM would give far finer settings than are required. A smaller ROM is cheaper, easier to set and a 7 bit ROM is chosen in practice as giving an at least adequate range of settings. According to a further aspect of the invention, a binary digital counter is provided to count the discrete output signals from the modulator and the apparatus is so arranged that the least significant bits are ignored. For example, there is provided a comparator operable to pass a distance sub-unit for incrementing the visual display and resetting the counter to zero when the count, ignoring the two least significant bits, coincides with the number stored in the ROM.

This arrangement is readily constructed using parts which are commercially available as standard products of minute size. It lends itself well, as does the form of modulator hereinbefore described, to mounting within the case of an electronic wrist watch together with the timing parts. Although distance travelled on foot is the product of the number of steps and the step length, the provision of multiplying apparatus is avoided.

BRIEF DESCRIPTION OF THE DRAWINGS

Further objects and advantages of the invention will be apparent to those skilled in the art from the accompanying drawings which are given to illustrate the invention by reference to a preferred embodiment. In the drawings:

FIG. 4 is a schematic diagram showing the electrical layout of the operating parts of the instrument.

DESCRIPTION OF THE PREFERRED EMBODIMENT

Figure 1:
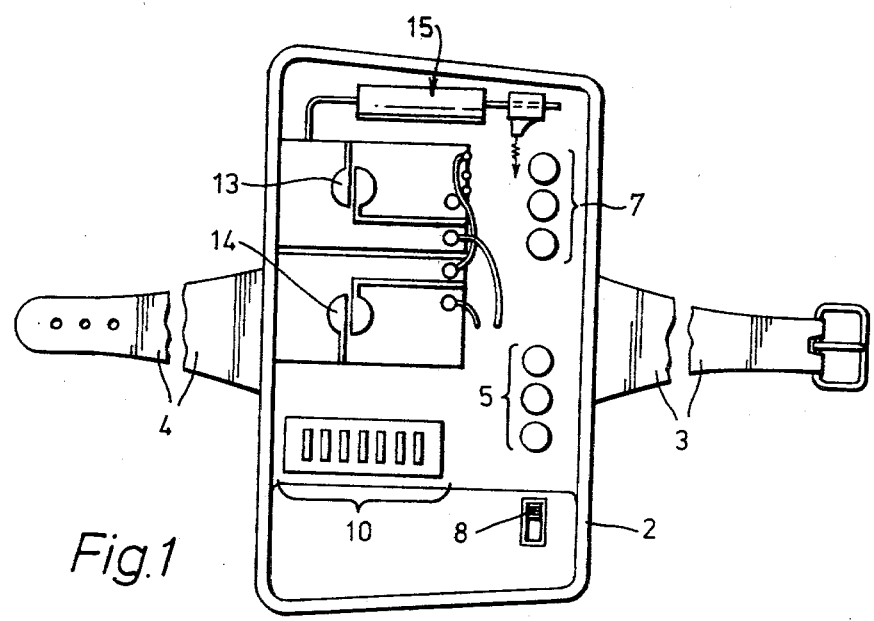
FIG. 1 shows a wrist-watch type instrument according to the invention in plan, with cover 1 (FIG. 2) removed.
Figure 2:
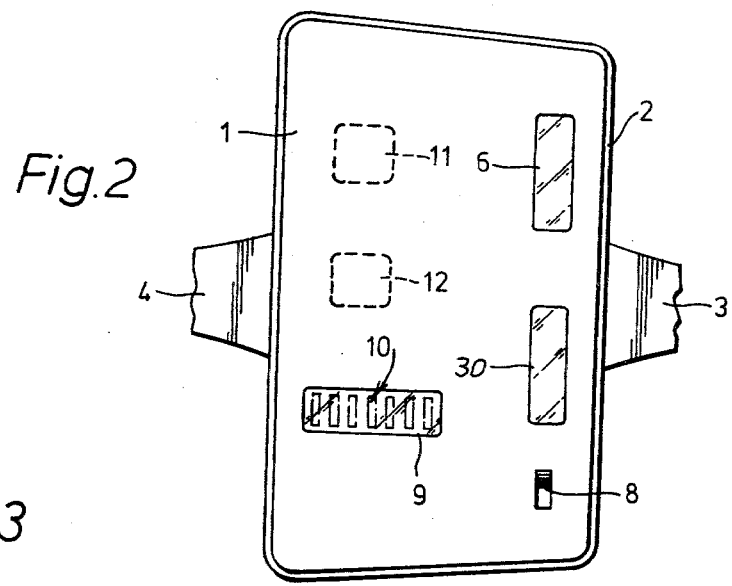
FIG. 2 shows the instrument of FIG. 1 with cover 1 in position.

The instrument of FIGS. 1 to 4 has a housing 2 of suitable dimensions for attachment to the wrist of the user (eg. 66×37 mm overall and a thickness of 19 mm). Conventional strap parts 3 & 4 are provided for fastening the housing to the wrist.

Cover 1, having a snap-fit within the top of housing 2 has a window 4 for viewing a three digit decimal distance display unit 5 and a window 6 for viewing an elapsed time display unit 7, also of the three digit decimal type. Units 5 and 7 display miles and tenths of a mile and minutes and tenths of a minute respectively.

An on-off switch 8 controlling an internal power supply of the mercury cell type projects through the cover 1.

An opening 9 gives access (eg. by a match-stick or other probe) to a read-only memory in the form of a set of seven tumbler switches 10 each of the on-off type which constitute a ROM as aforesaid.

Cover 1 is flexible and lines internally at 11 & 12 with patches of electrically conductive material. These patches over-lie pairs of conductive patches 13 & 14 of a distance and time display switch 13' and a reset switch 14' respectively. The switch 8, when moved to the off position, automatically resets the circuits to "zero".

Figure 3:
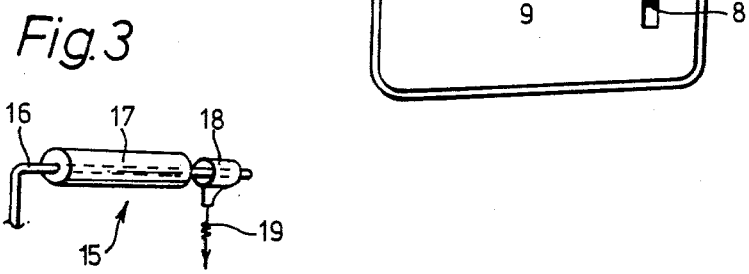
FIG. 3 shows the transducer of the instrument in perspective.

Within one end of the housing 2 is mounted an inertia switch device 15. As shown in FIG. 3, this device consists of a piece of spring-steel wire 16 bent as shown and bearing a metal cylinder 17 drilled axially to have a close mating fit over the wire 16. Beyond the cylinder 17, wire 16 passes axially through a hollow metal cylinder 18 connected in series with a 10K resistor 19. Motions of the wearer's wrist, produced for example during running cause the wire 16 to be brought smartly into contact with the interior of cylinder 18 by the inertia of cylinder 17. Less vigorous motions, produced for example during rest periods, may produce a light contact between wire 16 and cylinder 18, but the contact then has a significant resistance to add to the value of resistor 19. Only near-zero resistance between the wire and cylinder produce a counting function ie. the counting function to be described is insensitive to signals (current pulses) whose peaks are not comparable in magnitude to the current which would be produced by by-passing the wire and cylinder arrangement 16, 18.

The output pulses from arrangement 16, 18, shown diagrammatically as switch 20 in FIG. 4 are counted by a binary motion counter 21. This is a commercially available 12 bit counter (MOTOROLA 14040B) used for convenience. The two least significant bits of the counter output are ignored (so that the count is effectively divided by four) and the next seven bits are compared with the reading set on the ROM 10 by the tumbler switches. This reading corresponds with 0.1 mile travelled and its numerical value is inversely proportional to the step length.

When the seven bits correspond with the set reading on the ROM, nand gate system 22 passes-on a signal to increment a binary counter 23 by one unit. Counter 23 is connected in a conventional manner with distance decoder 24 and the decimal distance display 5. On closing switch 13', by pressing cover 1 over patch 11, display 5, which is of the LED type, is driven by display driver 25 to display the distance travelled by the wearer and the elapsed time.

Contained within the housing 2 is an RC oscillator 26 for generating a time signal. The oscillator output is passed through counters 31 and 27 to time decoder 28 and the elapsed time is exhibited in minutes and tenths by time display 29 (stop-watch function) when cover 1 is pressed over patch 12 to close time display switch 14'.

The time and distance measuring functions are obtained separately. The simplicity of the timing circuit, made possible by the lack of need for maintaining precision over long periods, the conversion of a stored inverse function of step-length by a simple counting, and the compactness of modern components giving simple standard functions, contribute to the ability to provide the apparatus in a housing 2 of convenient size for mounting on the wrist.

The ROM can be set by the user for his anticipated step length function, using a table for the necessary conversion to binary notation. It is convenient for the user to express his step length function in terms of a readily measured distance. Such distance need not be a simple fraction of a mile. It is best chosen for the convenience of the user and the binary notation which he is given can be such that his parameter is converted to a rational one for the required mileage indication.

An example of a binary notation table, given in terms of switch positions, for the number of steps to be taken in 50 feet of travel is given below.

TABLE

| Steps 50 ft. | Switch setting | | | | | | |
|---|---|---|---|---|---|---|---|
| | 1 | 2 | 3 | 4 | 5 | 6 | 7 |
| 10 | off | on | off | on | on | off | off |
| 11 | on | off | on | on | on | off | off |
| 12 | off | off | off | off | off | on | off |
| 13 | off | on | off | off | off | on | off |
| 14 | on | off | on | off | off | on | off |
| 15 | off | off | off | on | off | on | off |
| 16 | off | on | off | on | off | on | off |
| 17 | on | off | on | on | off | on | off |
| 18 | off | off | off | off | on | on | off |
| 19 | off | on | off | off | on | on | off |
| 20 | on | off | on | off | on | on | off |
| 21 | on | on | on | off | on | on | off |
| 22 | off | on | off | on | on | on | off |
| 23 | on | off | on | on | on | on | off |
| 24 | on | on | on | on | on | on | off |
| 25 | off | on | off | off | off | off | on |
| 26 | on | off | on | off | off | off | on |

TABLE-continued

| Steps | Switch setting | | | | | | |
|---|---|---|---|---|---|---|---|
| 50 ft. | 1 | 2 | 3 | 4 | 5 | 6 | 7 |
| 27 | on | on | on | off | off | off | on |
| 28 | off | on | off | on | off | off | on |
| 29 | on | off | on | on | off | off | on |
| 30 | on | on | on | on | off | off | on |
| 31 | off | on | off | off | on | off | on |
| 32 | off | off | on | off | on | off | on |
| 33 | on | on | off | off | on | off | on |
| 34 | off | on | off | on | on | off | on |
| 35 | off | off | on | on | on | off | on |
| 36 | on | on | on | on | on | off | on |
| 37 | off | on | off | off | off | on | on |
| 38 | off | off | on | off | off | on | on |
| 39 | on | on | on | off | off | on | on |
| 40 | off | on | off | on | off | on | on |
| 41 | off | off | on | on | off | on | on |
| 42 | on | on | on | on | off | on | on |
| 43 | off | on | off | off | on | on | on |
| 44 | off | off | on | off | on | on | on |
| 45 | on | on | on | off | on | on | on |
| 46 | on | off | off | on | on | on | on |
| 47 | off | off | on | on | on | on | on |
| 48 | on | on | on | on | on | on | on |

It will be appreciated that other forms of table may be employed. For example the table may be arranged so that the distance reading is obtained in kilometers rather than miles, if desired with the retention of the step length function in terms of feet. Any required decimal conversion can be incorporated in the allocation of the switch settings.

Those skilled in the art will recognise that the foregoing description is given by way of example only and that various departures may be made from the form of apparatus described without departing from the spirit and scope of the invention. A modulator other than a make and break inertia switch may be employed if desired. For example, there may be substituted a piezo electric pick-up arrangement sensitive to the changes of pressure of a mass-loading. With somewhat more complication, there may be substituted a coil spring with or without a ferro-magnetic core, suitably mass-loaded and a pulse generator circuit responsive to its changes of inductance.

We claim:

1. A pedometer device for indicating distance traveled on foot by a human subject, which device comprises:
   a battery powered electrical circuit having an output,
   a motion-sensitive modulator responsive to motions accompanying foot motions of the subject during said traveling to modulate said output and thereby provide discrete output signals, the number of which is a count of the number of said motions,
   means for providing a numerical value which is a function of the distance to be traveled by the subject for each one of said motions,
   a counter arrangement responsive to said output signals and to said means for providing a numerical value to produce a distance sub-unit signal each time the number of discrete output signals provided by said modulator reaches a preselected value, and
   means having a visual display arranged to be incremented by said distance sub-unit signals and indicate said distance travelled,
   said motion sensitive modulator being an on-off inertia switch, said circuit having a resistor in series with said inertia switch, and said counter arrangement being sensitive only to output signals of magnitude comparable with such output signals as would be obtainable by by-passing said inertia switch, and
   said counter arrangement having a binary digital counter arranged to provide a count of said discrete output signals in the form of a set of binary bits, the members of which set each have a different significance, the significances of the members of the set extending over a range from the least significant bit to the most significant bit, and said range having a commencing part containing a number of the least significant bits, and a remainder part containing the remaining bits of the range, and a comparator, operable to pass a distance sub-unit to said means having a visual display and to reset said binary digital counter to zero when the count represented by the bits of said remainder part coincides with the value at which said means for providing a numerical value is set.

2. A pedometer device according to claim 1 wherein said number of the least significant bits is 2.

3. A pedometer device according to claim 1 wherein the number of least significant bits is 2 and the remainder part contains 7 bits.

4. A pedometer device according to claim 1 wherein the binary digital counter is a 12 bit counter, the number of least significant bits is 2, the remainder part contains 7 bits making 9 used bits and the residual 3 bits of the counter are redundant.

5. A pedometer device for indicating distance traveled on foot by a human subject, which device comprises:
   a battery powered electrical circuit having an output,
   a motion sensitive modulator responsive to motions accompanying foot motions of the subject during said traveling to modulate said output and thereby provide discrete output signals, the number of which is a count of the number of said motions,
   means having a visual display and incrementable for indicating the distance traveled, and
   a counter arrangement responsive to said output signals, said counter arrangement having a binary digital counter arranged to provide a count of said discrete output signals in the form of a set of binary bits, the members of which set each have a different significance, the significances of the members of the set extending over a range from the least significant bit to the most significant bit, and said range having a commencing part containing a number of the least significant bits, and a remainder part containing the remaining bits of the range, and a comparator operable to pass a distance sub-unit to said means having a visual display for incrementing said means and to reset said binary digital counter to zero when the count represented by the bits of said remainder part coincides with a value representing a preselected number of discrete output signals provided by said modulator.

6. A pedometer device according to claim 5 wherein said number of the least significant bits is 2.

7. A pedometer device according to claim 5 wherein the number of least significant bits is 2 and the remainder part contains 7 bits.

8. A pedometer device according to claim 5 wherein the binary digital counter is a 12-bit counter, the number of least significant bits is 2, the remainder part contains 7 bits making 9 used bits and the residual free bits of the counter are redundant.

* * * * *